(12) United States Patent
Grambichler et al.

(10) Patent No.: US 10,254,303 B2
(45) Date of Patent: Apr. 9, 2019

(54) TWIST INDEPENDENT MOUNTING OF A WHEEL SPEED SENSOR USING A DIFFERENTIAL MAGNETORESISTIVE SENSOR

(71) Applicant: Infineon Technologies AG, Neubiberg (DE)

(72) Inventors: Klaus Grambichler, Velden (AT); Gernot Binder, Klagenfurt (AT); Jooil Park, Sungnal-Si (KR); Sehwan Kim, Suwon-Si (KR)

(73) Assignee: Infineon Technologies AG, Neubiberg (DE)

( * ) Notice: Subject to any disclaimer, the term of this patent is extended or adjusted under 35 U.S.C. 154(b) by 205 days.

(21) Appl. No.: 15/149,647

(22) Filed: May 9, 2016

(65) Prior Publication Data

US 2017/0322233 A1 Nov. 9, 2017

(51) Int. Cl.
| | |
|---|---|
| *G01P 3/487* | (2006.01) |
| *G01P 13/04* | (2006.01) |
| *G01D 5/16* | (2006.01) |
| *G01P 3/488* | (2006.01) |
| *G01D 5/244* | (2006.01) |
| *G01D 5/14* | (2006.01) |
| *G01D 5/245* | (2006.01) |

(52) U.S. Cl.
CPC ............ *G01P 3/487* (2013.01); *G01D 5/16* (2013.01); *G01D 5/24438* (2013.01); *G01P 3/488* (2013.01); *G01P 13/045* (2013.01); *G01D 5/147* (2013.01); *G01D 5/2451* (2013.01)

(58) Field of Classification Search
CPC .......... G01P 3/487; G01P 13/045; G01D 5/16
See application file for complete search history.

(56) References Cited

U.S. PATENT DOCUMENTS

| | | | | |
|---|---|---|---|---|
| 6,828,781 | B1 * | 12/2004 | Butzmann | G01P 3/488 |
| | | | | 324/207.19 |
| 7,592,803 | B1 * | 9/2009 | Guo | B82Y 25/00 |
| | | | | 324/207.21 |
| 9,817,082 | B2 * | 11/2017 | Sebastiano | G01R 33/06 |
| 2014/0232379 | A1 * | 8/2014 | Nazarian | G01D 5/147 |
| | | | | 324/207.21 |

* cited by examiner

*Primary Examiner* — Huy Q Phan
*Assistant Examiner* — Zannatul Ferdous
(74) *Attorney, Agent, or Firm* — Harrity & Harrity, LLP (57) ABSTRACT

A magnetic sensor may include a first sensing element and a second sensing element. The first sensing element may be capable of sensing a first component of a magnetic field that is non-parallel to an axis formed by an intersection of a first plane and a second plane. The first plane may be a plane in which a tooth wheel rotates, and the second plane may include a first surface of the first sensing element and a second surface of the second sensing element. The first component of the magnetic field may be on the second plane. The second sensing element may be capable of sensing a second component of the magnetic field. The second component of the magnetic field may be on the second plane.

20 Claims, 6 Drawing Sheets

TWIST INDEPENDENT MOUNTING OF A WHEEL SPEED SENSOR USING A DIFFERENTIAL MAGNETORESISTIVE SENSOR

BACKGROUND

A magnetic sensor may sense a magnetic field, produced by a back-bias magnet, that is modulated by a rotating magnet wheel, such as a ferromagnetic tooth wheel. The magnetic sensor may output, based on the sensed magnetic field, a signal for use in identifying a position of the magnet wheel or a rotational speed of the magnet wheel.

SUMMARY

According to some possible implementations, a magnetic sensor may include: a first sensing element and a second sensing element, where the first sensing element may be capable of sensing a first component of a magnetic field, where the first component of the magnetic field may be non-parallel to an axis formed by an intersection of a first plane and a second plane, where the first plane may be a plane in which a tooth wheel rotates and the second plane may include a first surface of the first sensing element and a second surface of the second sensing element, and where the first component of the magnetic field may be on the second plane; and where the second sensing element may being capable of sensing a second component of the magnetic field, where the second component of the magnetic field may be on the second plane.

According to some possible implementations, a magnetic circuit, may include a magnetic sensor to: sense a first component of a magnetic field that is angled with respect to an axis formed by an intersection of a first plane and a second plane, where the first plane may be a plane in which a tooth wheel rotates, the second plane may correspond to a surface of the magnetic sensor, and the first component of the magnetic field may lie on the second plane; sense a second component of the magnetic field, where the second component of the magnetic field may lie on the second plane; determine a speed signal, associated with a rotation of the tooth wheel, based on the first component of the magnetic field and the second component of the magnetic field; and provide an output based on the speed signal.

According to some possible implementations, a differential sensor may include: a first magnetoresistive (MR) sensing element and a second MR sensing element, where the first MR sensing element may be capable of sensing a first component of a magnetic field that is at a non-zero angle with respect to an axis formed by an intersection of a first plane and a second plane, where the first plane may be a plane in which a tooth wheel rotates, the second plane may correspond to a surface including the first MR sensing element the second MR sensing element, and the first component of the magnetic field may be on the second plane; and where the second MR sensing element may be capable of sensing a second component of the magnetic field, where the second component of the magnetic field may be on the second plane.

DETAILED DESCRIPTION

The following detailed description of example implementations refers to the accompanying drawings. The same reference numbers in different drawings may identify the same or similar elements.

A magnetic sensor may be used to determine a speed and/or a rotational angle of a rotating object in, for example, an automotive context (e.g., a crankshaft, a camshaft, or an axle). The magnetic sensor may provide outputs based on sensing a magnetic field present at the magnetic sensor. The magnetic field may be produced by a magnet and distorted by a tooth wheel, made of a ferromagnetic material, that is positioned relative to the magnetic sensor. As a particular example, the magnetic sensor may provide a first output (e.g., a signal with a first voltage level, a signal with a first current level) while a speed signal, corresponding to the strength of the magnetic field present at the magnetic sensor, satisfies a switching threshold (e.g., is greater than a particular magnetic field strength) and may provide a second output (e.g., a signal with a second voltage level, a signal with a second current level) while the speed signal does not satisfy the switching threshold (e.g., when the speed signal is less than or equal to the particular magnetic field strength). An electronic control unit (ECU) may receive the outputs provided by the magnetic sensor and, based on the outputs, may determine the speed of the tooth wheel (e.g., for use in controlling one or more systems).

In some cases, the magnetic sensor may be implemented as a differential Hall sensor that senses a component of the magnetic field corresponding to an axis that is substantially perpendicular to an axis of rotation of the tooth wheel and substantially perpendicular to a surface of the differential Hall sensor (herein referred to as an out-of-plane component or a z-component). In such a case, the differential Hall sensor may include a set of sensing elements (e.g., a first sensing element and a second sensing element) to sense, based on a Hall-effect, the out-of-plane component of the magnetic field at a first location (e.g., a first edge of the magnetic sensor) and a second location (e.g., a second edge of the magnetic sensor). Here, the differential Hall sensor may determine the speed signal during rotation of the tooth wheel as a difference between the strength of the magnetic field component sensed by the first sensing element and the strength of the magnetic field component sensed by the second sensing element.

In order to determine a strongest possible speed signal, the differential Hall sensor should be mounted, relative to the tooth wheel, with a 0° twist angle. In other words, the differential Hall sensor should be mounted such that, during rotation of the tooth wheel, a difference between a time at which a particular portion of the tooth wheel (e.g., a center of a tooth) passes the first sensing element and a time at which the particular portion of the tooth wheel passes the second sensing element is as large as possible. Such mounting ensures that the differential Hall sensor is capable of sensing each tooth and/or notch of the tooth wheel (i.e., that the differential Hall sensor is capable of determining a speed signal that is modulated to indicate a presence of each tooth and/or notch). Mounting the differential Hall sensor with a 180° twist angle may also permit the differential Hall sensor to determine the strongest possible speed signal (e.g., since the 180° twist angle causes the positioned of the sensing elements be similar to the 0° twist angle).

Mounting the differential Hall sensor with a twist angle other than 0° or 180°, with respect to a plane in which the tooth wheel rotates, causes the speed signal, determined by the differential Hall sensor, to be decreased in strength (as compared to a 0° or 180° twist angle). For example, in a case where the differential Hall sensor is mounted with a twist angle of approximately 90° or 270° (e.g., such that a center of a tooth passes the first sensing element and the second sensing element at approximately a same time), the differential Hall sensor may determine a zero speed signal throughout rotation of the tooth wheel (e.g., a speed signal with a strength that remains at approximately zero at all times during rotation of the tooth wheel). This occurs since both sensing elements sense a same magnetic field strength of the out-of-plane component at all times throughout rotation of the tooth wheel (i.e., a difference between the out-of-plane components sensed by the differential Hall sensor is approximately equal to zero throughout rotation).

As such, twist independent mounting (TIM) is not possible for the differential Hall sensor (and other types of differential magnetic sensors that use the out-of-plane component of the magnetic field for determination of the speed signal). A magnetic sensor capable of TIM is a magnetic sensor that is capable of determining a speed signal independent of an angle at which the magnetic sensor is mounted (e.g., any angle from 0° to 360°). The lack of TIM capability of the differential Hall sensor may require multiple differential Hall sensor modules and/or magnetic circuit designs for multiple applications (e.g., a different differential Hall sensor module and/or magnetic circuit design for each possible mounting position and/or air gap size), thereby increasing manufacturing costs and/or design complexity associated with implementing such differential Hall sensors.

A magnetic sensor capable of TIM may be advantageous in that a mounting tolerance, associated with mounting the magnetic sensor, may be increased. This may allow for reduced costs (e.g., monetary, temporal) associated with mounting the magnetic sensor. Similarly, a magnetic sensor capable of TIM may reduce manufacturing costs and/or design complexity, since a magnetic sensor module with TIM-capability may be used in a wider range of applications (as compared to the differential Hall sensor).

Moreover, a magnetic sensor capable of TIM may allow for simplified setting and/or adjustment of an air gap of a magnetic circuit that includes the TIM-capable magnetic sensor (e.g., as compared to a magnetic sensor that is not capable of TIM, such as the differential Hall sensor). For example, in some cases, the TIM-capable magnetic sensor may be mounted using a screw-like module that allows the air gap to be increased or decreased by twisting the screw-like module (e.g., to move the magnetic sensor closer to or further from the tooth wheel). In some implementations, a usable air gap of the TIM-capable magnetic sensor may be less than or equal to approximately three millimeters. Such adjustment may not be possible (or may be more limited and/or more difficult) with a magnetic sensor that is not capable of TIM, such as the differential Hall sensor.

One type of magnetic sensor that is capable of TIM is a magnetic sensor with a single sensing element (herein referred to as a single-element sensor), such as a variable reluctance (VR) sensor, a mono-cell Hall sensor, or the like. However, unlike a differential sensor (e.g., the differential Hall sensor), a single-element sensor is not robust against stray magnetic fields (i.e., external disturbance fields) present at the single-element sensor. A stray magnetic field present at the single-element sensor may cause the single-element sensor to inaccurately determine the speed signal, thereby affecting performance of the magnetic sensor (i.e., the stray magnetic field may interfere with sensing of the magnetic field produced by the magnet). This problem may particularly affect an electric vehicle and/or a hybrid vehicle, where a stray magnetic field may be present due to a large amount of current associated with the electric vehicle and/or inductive charging associated with the electric vehicle. While it may be possible to shield the single-element sensor from such stray magnetic fields, providing shielding for the single-element sensor may lead to increased manufacturing and/or design costs and/or complexities.

Implementations described herein may relate to a differential magnetic sensor capable of TIM. In some implementations, the differential sensor capable of TIM (herein referred to as a TIM-capable differential sensor) may include two or more sensing elements capable of sensing a component of the magnetic field that lies in a plane corresponding to surfaces of the two or more sensing elements (herein referred to as an in-plane component of the magnetic field, an x-component of the magnetic field, or a y-component of the magnetic field). In some implementations, the in-plane component of the magnetic field may be parallel to or non-parallel to (i.e., at a non-zero angle, not aligned with, angled with respect to, or the like) an axis formed by an intersection of a plane in which the tooth wheel rotates (herein referred to as a rotational plane) and the plane corresponding to the surfaces of the two or more sensing elements.

The TIM-capable differential sensor may determine the speed signal based on a difference between the strength of the magnetic field as sensed by each of the two or more sensing elements, and may provide outputs from which the ECU may determine the speed of the tooth wheel (e.g., in a manner similar to the differential Hall sensor described above).

In some implementations, the TIM-capable differential sensor may include two or more sensing elements capable of measuring magnetoresistance (MR) (also referred to as magnetoresistive sensing elements or MR sensing elements). It may be advantageous to implement the TIM-capable differential sensor in that MR-based sensing provides improved jitter performance at a lower current consumption (e.g., as compared to Hall-based sensing). The sensing elements of the TIM-capable sensor may measure magnetoresistance based on, for example, an anisotropic magnetoresistance (AMR) effect, a giant magnetoresistance (GMR) effect, a tunnel magnetoresistance (TMR) effect, or the like.

Notably, while implementations described herein are described in the context of MR-based sensors, in some implementations, another type of differential sensor capable of sensing an in-plane component of a magnetic field may be used, such as a Hall-based sensor capable of sensing an in-plane component of a magnetic field, or the like. Further, while implementations described herein are described in the context of a tooth wheel, in some implementations, another type of wheel may be used.

Figure 1A:
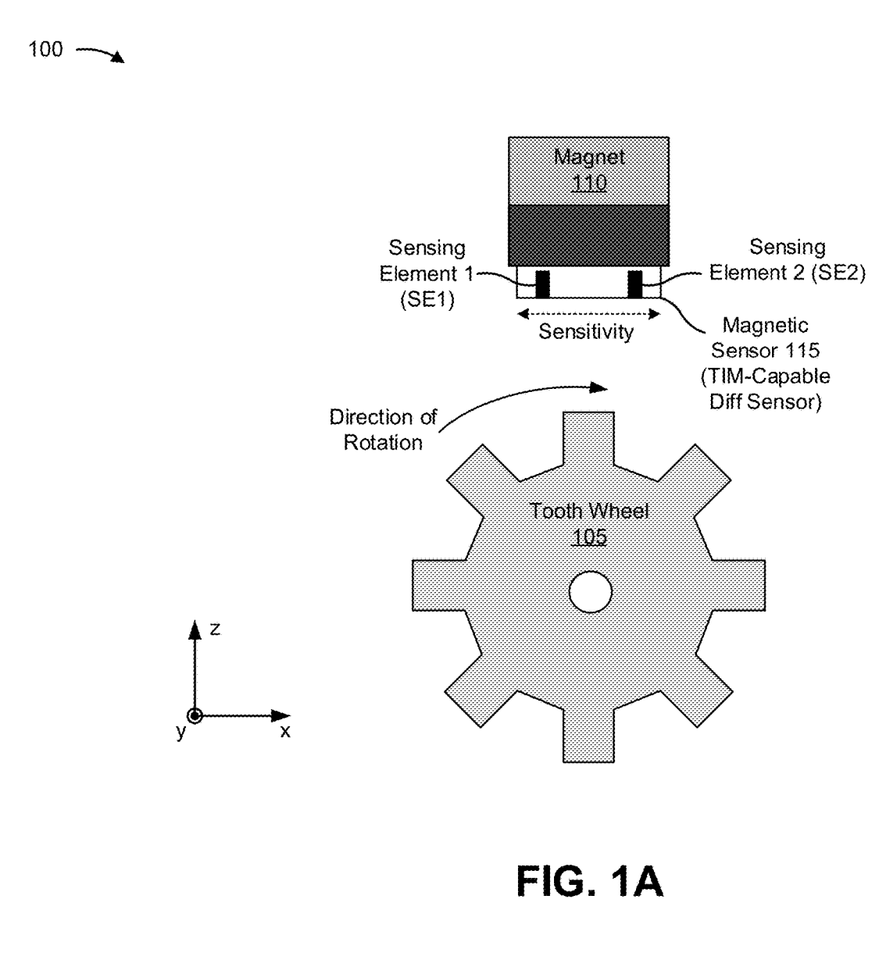
FIGS. 1A-1C are diagrams of an overview of example implementations described herein.
Figure 1B:
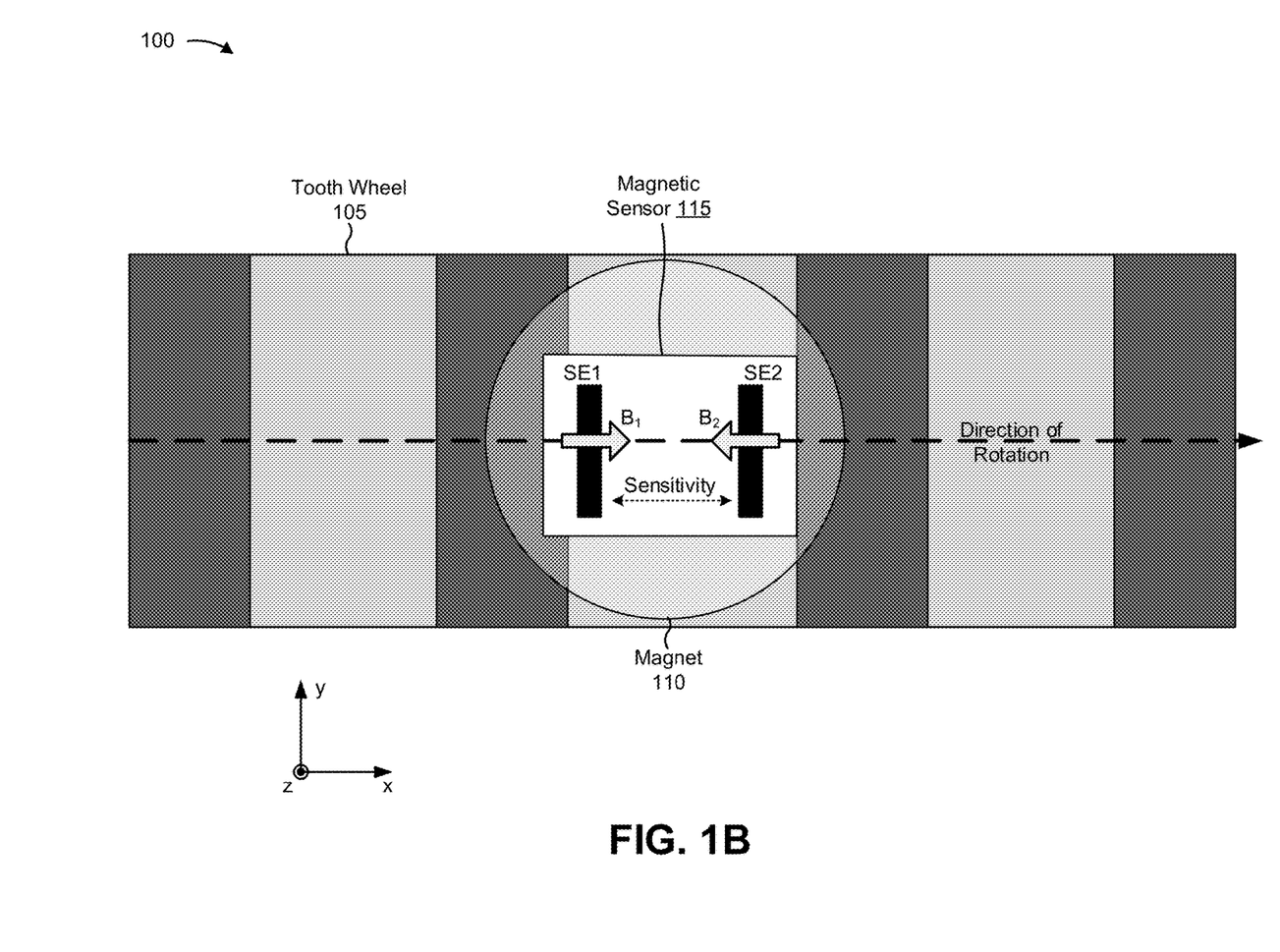
Figure 1C:
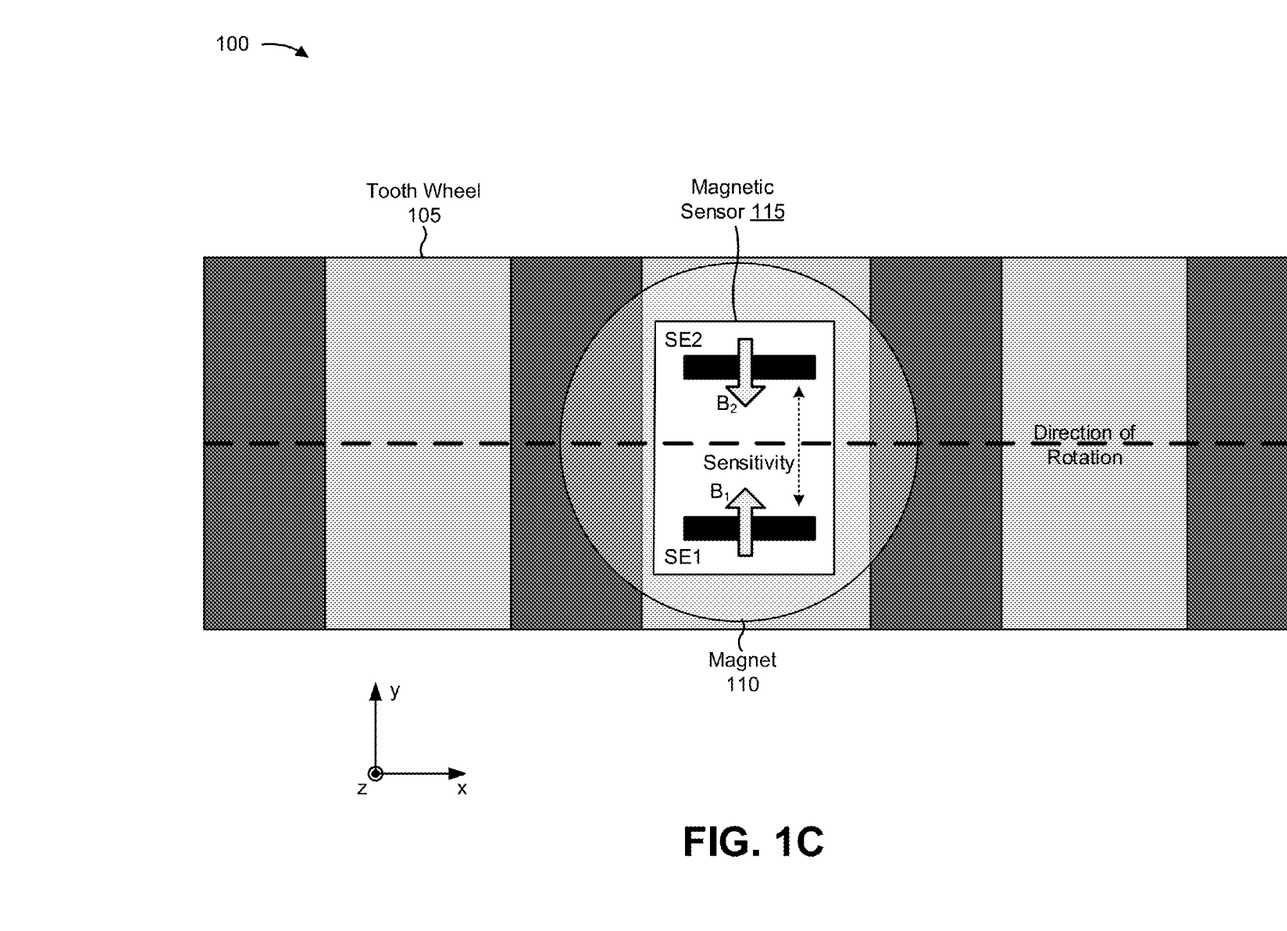

FIGS. 1A-1C are diagrams of an overview of example implementations described herein. FIG. 1A is a front view of a magnetic circuit 100 comprising a tooth wheel 105, a magnet 110, and a TIM-capable differential sensor (identified as magnetic sensor 115). As shown in FIG. 1A, magnetic sensor 115 may be mounted such that magnetic sensor 115 is positioned between magnet 110 and tooth wheel 105

(e.g., such that magnetic sensor 115 may sense a magnetic field produced by magnet 110 and distorted by tooth wheel 105).

As shown in FIG. 1A, tooth wheel 105 may rotate such that teeth and notches of tooth wheel 105 alternately pass magnetic sensor 115, causing modulation of the magnetic field produced by magnet 110. Here, tooth wheel 105 rotates in an x-direction relative to magnetic sensor 115 (i.e., the top of tooth wheel 105 may be viewed as moving in the x-direction relative to magnetic sensor 115). As further shown, magnetic sensor 115 may include a first sensing element (e.g., sensing element 1) and a second sensing element (e.g., sensing element 2) that are capable of sensing an in-plane component of the magnetic field produced by magnet 110.

FIG. 1B is a top view of a first arrangement of magnetic circuit 100 comprising tooth wheel 105, magnetic sensor 115, and magnet 110. As shown in FIG. 1B, magnetic sensor 115 may be mounted such that an axis of sensitivity (e.g., an axis corresponding to a component of the magnetic field that the first sensing element and the second sensing element are capable of sensing) aligns with the direction of rotation of tooth wheel 105 (e.g., the x-direction). In other words, in FIG. 1B, magnetic sensor 115 has a twist angle of 0°. The axis of sensitivity of the first sensing element and the second sensing element is indicated by the dotted arrow labeled "sensitivity" in FIG. 1B.

As shown in FIG. 1B, the first sensing element and the second sensing element may sense the component of the magnetic field that corresponds to the x-direction (i.e., the in-plane component of the magnetic field that is sensed by the first sensing element and the second sensing element may align with the x-direction identified in FIG. 1B). Here, magnetic sensor 115 may determine a speed signal based on a difference between a strength of the in-plane component of the magnetic field sensed by the first sensing element (e.g., labeled as $B_1$ in FIG. 1B) and a strength of the in-plane component of the magnetic field as sensed by the second sensing element (e.g., labeled as $B_2$ in FIG. 1B).

A differential Hall sensor, or another type of sensor that uses the out-of-plane component of the magnetic field (e.g., corresponding to the z-direction in FIG. 1B) to determine a speed signal, may also determine a speed signal using the arrangement of FIG. 1B, due to the 0° twist angle, as described above. However, magnetic sensor 115 may determine a speed signal independent of a twist angle, unlike the differential Hall sensor, as described below.

FIG. 1C is a top view of a second arrangement of magnetic circuit 100 comprising tooth wheel 105, magnetic sensor 115, and magnet 110. As shown in FIG. 1C, magnetic sensor 115 may be mounted such that an axis of sensitivity is rotated approximately 90° with respect to the direction of rotation of tooth wheel 105 (i.e., magnetic sensor 115 has a twist angle of 90° in FIG. 1C). Put another way, the in-plane component of the magnetic field, that the first sensing element and the second sensing element are capable of sensing, is non-parallel (e.g., orthogonal) to a rotational plane of the tooth wheel. The axis of sensitivity of the first sensing element and the second sensing element is indicated by the dotted arrow labeled "axis of sensitivity" in FIG. 1C.

As shown in FIG. 1C, the component of the magnetic field sensed by the first sensing element and the second sensing element may correspond to a y-direction (i.e., the in-plane component of the magnetic field that is sensed by the first sensing element and the second sensing element may be aligned with the y-direction identified in FIG. 1C). Here, magnetic sensor 115 may determine a speed signal based on a difference between the strength of the in-plane component of the magnetic field sensed by the first sensing element (e.g., labeled as $B_1$ in FIG. 1C) and a strength of the in-plane component of the magnetic field as sensed by the second sensing element (e.g., labeled as $B_2$ in FIG. 1C).

The differential Hall sensor (or another type of sensor that uses the out-of-plane component of the magnetic field to determine the speed signal) may be unable to determine a speed signal using the arrangement of FIG. 1C due to the 90° twist angle, as described above, since the sensing elements of the differential Hall sensor would sense a same magnetic field strength throughout rotation of tooth wheel 105. However, as shown, the first sensing element and the sensing element of magnetic sensor 115 sense different magnetic strengths. Thus, magnetic sensor 115 may determine a speed signal independent of a twist angle, unlike the differential Hall sensor.

In some implementations, magnetic sensor 115 may be mounted with any twist angle from 0° to 360°, inclusive (i.e., any angle including those shown in FIGS. 1B and 1C). In such cases, magnetic sensor 115 is capable of determining a speed signal associated with tooth wheel 105, regardless of the twist angle at which magnetic sensor 115 is mounted.

In this way, a differential magnetic sensor, including two or more sensing elements capable of sensing an in-plane component of the magnetic field, may be capable of TIM and, thus, may be capable of determining a speed signal, based on the in-plane component of the magnetic field, independent of a twist angle at which the differential magnetic sensor is mounted.

As indicated above, FIGS. 1A-1C are provided merely as examples. Other examples are possible and may differ from what was described with regard to FIGS. 1A-1C.

Additionally, the number and arrangement of elements shown in FIGS. 1A-1C are provided as examples. In practice, the TIM-capable differential sensor may include additional elements, fewer elements, different elements, or differently arranged elements than those shown in FIGS. 1A-1C. Additionally, or alternatively, a set of elements (e.g., one or more elements) of the TIM-capable differential sensor may perform one or more functions described as being performed by another set of elements of TIM-capable differential sensor.

Figure 2:
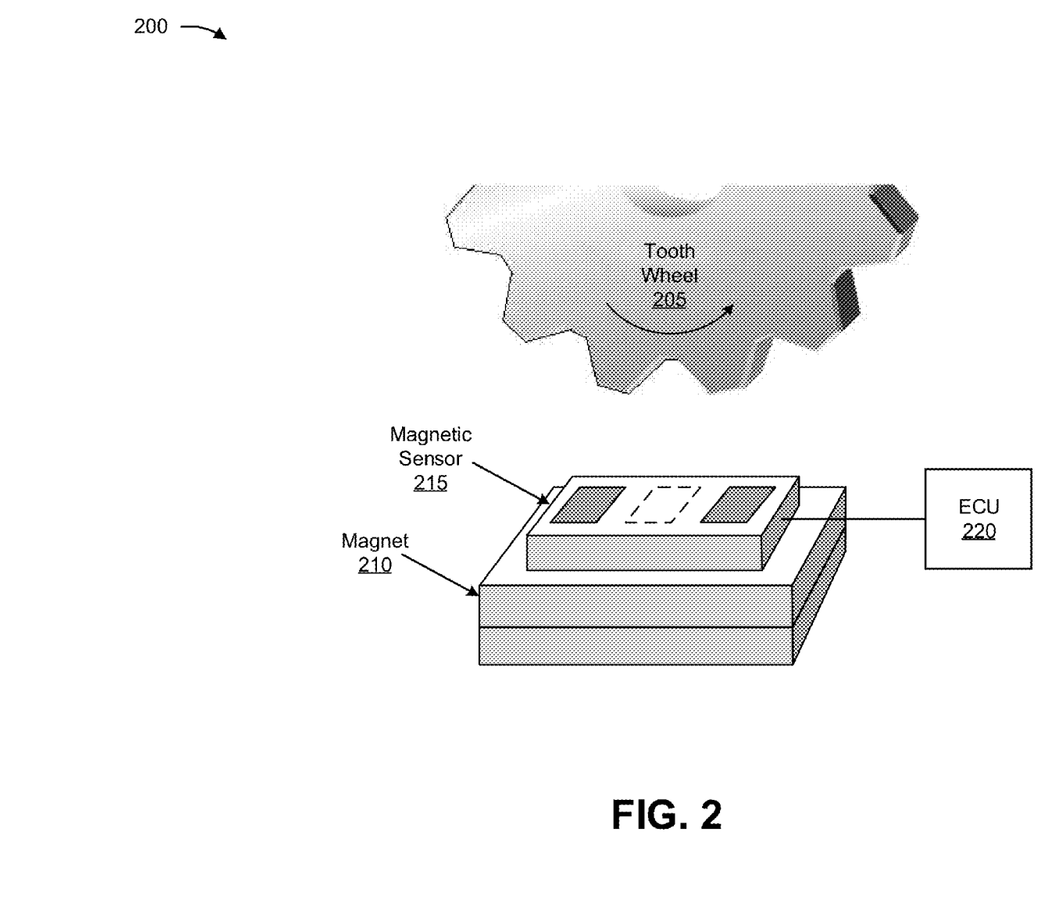
FIG. 2 is a diagram of an example environment in which apparatuses described herein may be implemented.

FIG. 2 is a diagram of example environment 200 in which apparatuses described herein may be implemented. As shown in FIG. 2, environment 200 may include a tooth wheel 205, a magnet 210, a magnetic sensor 215, and an ECU 220 that is connected (e.g., via wired connection) to magnetic sensor 215.

Tooth wheel 205 includes a wheel comprising a set of teeth. Tooth wheel 205 may correspond to tooth wheel 105 described above with regard to FIGS. 1A-1C. In some implementations, tooth wheel 205 may, during a rotation, distort a magnetic field of a magnet 210 such that magnetic sensor 215 may sense the distorted magnetic field associated with magnet 210. In some implementations, tooth wheel 205 may be comprised of a ferromagnetic material, and may produce a magnetic field. In some implementations, tooth wheel 205 may be attached to or coupled with an object for which a speed, a rotational direction, and/or a position is to be measured, such as a cylindrical structure (e.g., a crankshaft, a camshaft, or a rotating cylinder), a wheel structure (e.g., associated with a tire), an axle (e.g., a vehicle axle), or the like.

In some implementations, tooth wheel 205 may include a first section that includes a set of teeth around a first portion of a circumference of tooth wheel 205, and a second section that has no teeth around a second portion of the circumference of tooth wheel 205. Within the first section, each of the set of teeth may be separated by a particular width (herein referred to as a tooth gap), and the second section may have a width that is greater than one tooth gap (herein referred to as a reference zone). In some implementations, such as in a crankshaft context, tooth wheel 205 may include a symmetrical tooth wheel, where teeth of tooth wheel 205 have a same width and tooth gaps of tooth wheel 205 have a same width (other than within the reference zone). In some implementations, such as in a camshaft context, tooth wheel 205 may include an asymmetrical tooth wheel, where teeth of tooth wheel 205 have varying widths and/or tooth gaps of tooth wheel 205 have varying widths (e.g., with no reference zone).

Magnet 210 includes a magnet that produces a magnetic field that may be sensed by magnetic sensor 215. Magnet 210 may correspond to magnet 110 described above with regard to FIGS. 1A-1C. In some implementations, magnet 210 may be positioned such that the magnetic field, produced by magnet 210, is distorted by tooth wheel 205. Additionally, or alternatively, magnet 210 may include a back-bias magnet and/or may be positioned near, included in, and/or attached to magnetic sensor 215.

Magnetic sensor 215 includes a housing associated with one or more elements of a sensor, such as a magnetoresistive (MR) sensor. Magnetic sensor 215 may correspond to magnetic sensor 115 described above with regard to FIGS. 1A-1C. In some implementations, magnetic sensor 215 may be connected to ECU 220 such that magnetic sensor 215 may provide outputs, associated with tooth wheel 205, to ECU 220 via one or more transmission interfaces (e.g., a voltage interface or a current interface) and/or via one or more output terminals. In some implementations, magnetic sensor 215 may include a three-wire sensor (e.g., including one output terminal), a four-wire sensor (e.g., including two output terminals), or the like. Additional details regarding magnetic sensor 215 are described below with regard to FIG. 3.

ECU 220 includes a device associated with controlling one or more electrical systems and/or electrical subsystems, such as one or more electrical systems and/or one electrical subsystems included in a motor vehicle. For example, ECU 220 may include an electronic/engine control module (ECM), a powergain control module (PCM), a transmission control module (TCM), a brake control module (BCM), an electronic brake control module (EBCM) a central control module (CCM), a central timing module (CTM), a general electronic module (GEM), a body control module (BCM), a suspension control module (SCM), or the like.

In some implementations, ECU 220 may be connected to magnetic sensor 215 such that ECU 220 may receive outputs, associated with the rotation of tooth wheel 205, via one or more transmission interfaces and/or via one or more output terminals. In some implementations, ECU 220 may be capable of calibrating, controlling, adjusting, or the like, the one or more electrical systems and/or electrical subsystems based on the information transmitted by magnetic sensor 215.

In some implementations, one or more apparatuses of environment 200 may be included in a magnetic circuit. For example, the magnetic circuit may include magnetic sensor 215; magnetic sensor 215 and tooth wheel 205; magnetic sensor 215, tooth wheel 205, and magnet 210; magnetic sensor 215, tooth wheel 205, magnet 210, and ECU 220; magnetic sensor 215, magnet 210, and ECU 220; magnetic sensor 215, tooth wheel 205, and ECU 220; magnetic sensor 215 and ECU 220; or the like.

The number and arrangement of apparatuses shown in FIG. 2 is provided as an example. In practice, there may be additional apparatuses, fewer apparatuses, different apparatuses, or differently arranged apparatuses than those shown in FIG. 2. Furthermore, two or more apparatuses shown in FIG. 2 may be implemented within a single apparatus, or a single apparatus shown in FIG. 2 may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
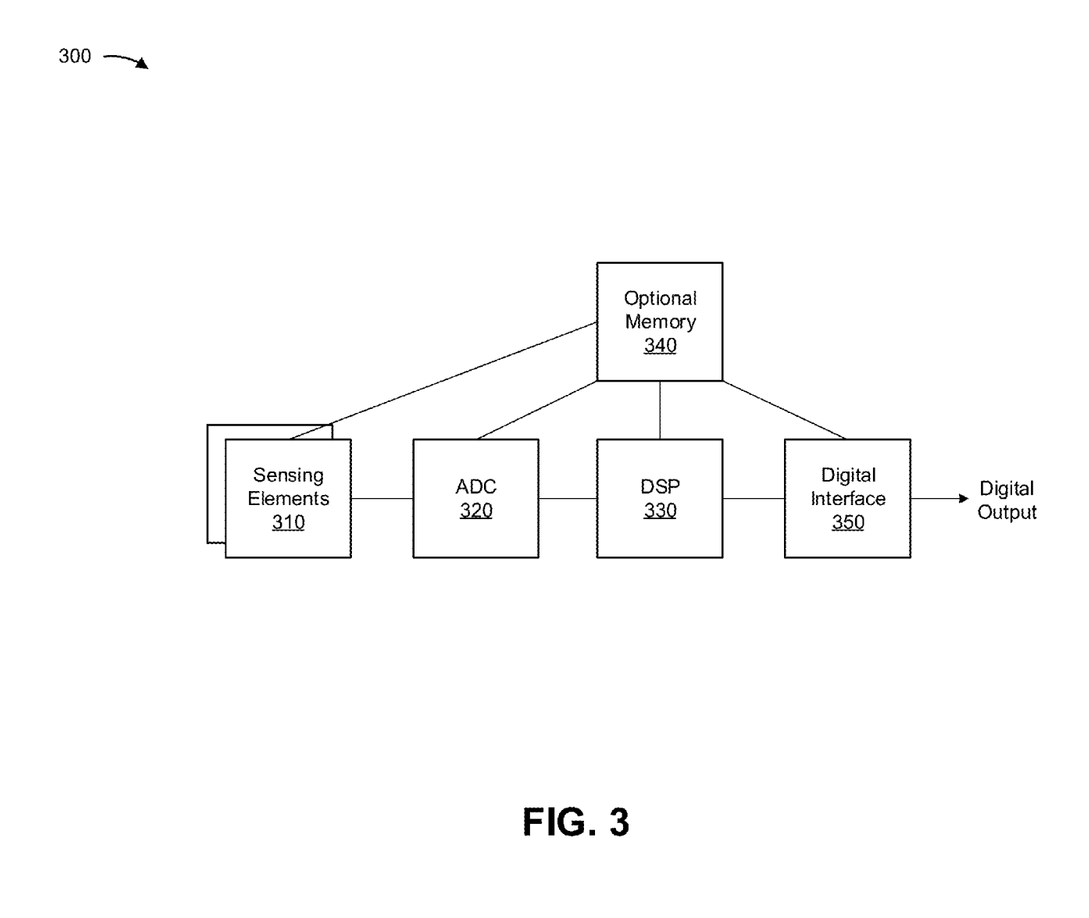
FIG. 3 is a diagram of example elements of a magnetic sensor included in the example environment of FIG. 2.

FIG. 3 is a diagram of example elements of magnetic sensor 215 included in example environment 200 of FIG. 2. As shown, magnetic sensor 215 may include two or more sensing elements 310, an analog-to-digital convertor (ADC) 320, a digital signal processor (DSP) 330, an optional memory element 340, and a digital interface 350.

Sensing element 310 includes one or more apparatuses for sensing an amplitude of a component of a magnetic field present at magnetic sensor 215 (e.g., the magnetic field generated by magnet 210). Sensing element 310 may correspond to sensing element 1 and sensing element 2 as described above with regard to FIGS. 1A-1C. For example, sensing element 310 may include a MR sensing element capable of sensing an in-plane component of a magnetic field. As a particular example, sensing element 310 may be comprised of a magnetoresistive material (e.g., nickel iron (NiFe)), where the electrical resistance of the magnetoresistive material may depend on a strength and/or a direction of the magnetic field present at the magnetoresistive material. Here, sensing element 310 may measure magnetoresistance based on an AMR effect, a GMR effect, a TMR effect, or the like. In some implementations, sensing element 310 may provide an analog signal, corresponding to the amplitude of the component of the magnetic field, to ADC 320.

ADC 320 includes an analog-to-digital converter that converts an analog signal from the one or more sensing elements 310 to a digital signal. For example, ADC 320 may convert analog signals, received from the one or more sensing elements 310, into digital signals to be processed by DSP 330. ADC 320 may provide the digital signals to DSP 330. In some implementations, magnetic sensor 215 may include one or more ADCs 320.

DSP 330 includes a digital signal processing device or a collection of digital signal processing devices. In some implementations, DSP 330 may receive digital signals from ADC 320 and may process the digital signals to form output signals (e.g., destined for ECU 220 as shown in FIG. 2), such as output signals associated with determining the speed of tooth wheel 205.

Optional memory element 340 includes a read only memory (ROM), an EEPROM, a random access memory (RAM), and/or another type of dynamic or static storage device (e.g., a flash memory, a magnetic memory, or an optical memory) that stores information and/or instructions for use by magnetic sensor 215. In some implementations, optional memory element 340 may store information associated with processing performed by DSP 330. Additionally, or alternatively, optional memory element 340 may store configurational values (e.g., a switching threshold value) or parameters for sensing elements 310 and/or information for one or more other elements of magnetic sensor 215, such as ADC 320 or digital interface 350.

Digital interface 350 includes an interface via which magnetic sensor 215 may receive and/or provide information from and/or to another device, such as ECU 220. For example, digital interface may provide the output determined by DSP 330 to ECU 220 in the form of an output voltage, an output current, or the like. In some implementations, magnetic sensor 215 may include a set of digital interfaces, where one of more digital interfaces, in the set of digital interfaces, may be associated with one or more output terminals of magnetic sensor 215.

The number and arrangement of elements shown in FIG. 3 are provided as an example. In practice, magnetic sensor 215 may include additional elements, fewer elements, different elements, or differently arranged elements than those shown in FIG. 3. Additionally, or alternatively, a set of elements (e.g., one or more elements) of magnetic sensor 215 may perform one or more functions described as being performed by another set of elements of magnetic sensor 215.

Figure 4A:
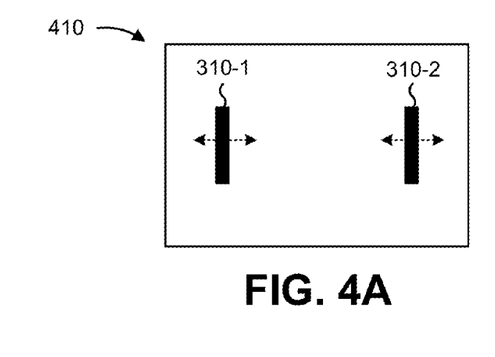
FIGS. 4A-4C are diagrams of example arrangements of sensing elements included in the magnetic sensor of example environment of FIG. 2.
Figure 4B:
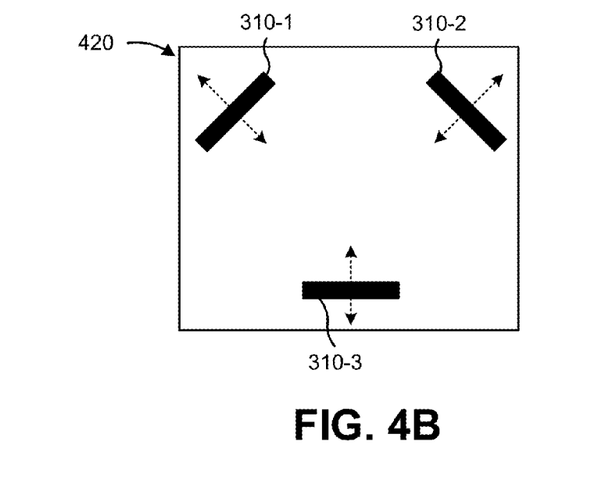
Figure 4C:
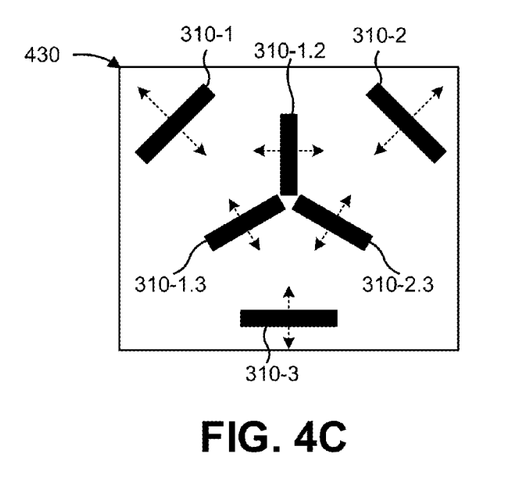

FIGS. 4A-4C are diagrams of example arrangements 410, 420, and 430 of sensing elements 310 included in magnetic sensor 215. For the purposes of FIGS. 4A-4C, assume that sensing elements 310 of magnetic sensor 215 are capable of sensing an in-plane component of a magnetic field generated by magnet 210 and distorted by tooth wheel 205, as described above.

FIG. 4A is a diagram of a first example arrangement 410 of sensing elements 310 included in magnetic sensor 215. As shown, magnetic sensor 215 may include a first sensing element 310 (e.g., sensing element 310-1) and a second sensing element 310 (e.g., sensing element 310-2). As shown, sensing element 310-1 and sensing element 310-2 may be arranged such that an axis of sensitivity of sensing element 310-1 aligns with an axis of sensitivity of sensing element 310-2. Such an arrangement may allow magnetic sensor 215 to determine a speed signal independent of the twist angle at which magnetic sensor 215 is mounted, as described above.

FIG. 4B is a diagram of a second example arrangement 420 of sensing elements 310 included in magnetic sensor 215. As shown, magnetic sensor 215 may include sensing element 310-1, sensing element 310-2, and a third sensing element 310 (e.g., sensing element 310-3). As shown in FIG. 4B, sensing element 310-1, sensing element 310-2, and sensing element 310-3 may be arranged at angles (e.g., 120° angles) with respect to one another. As such, respective axes of sensitivity of sensing element 310-1, sensing element 310-2, and sensing element 310-3 may be angled with respect to one another (e.g., each axis of sensitivity may be at a 120° angle with respect to the other axes of sensitivity). In some implementations, angles at which sensing element 310-1, sensing element 310-2, and sensing element 310-3 are oriented with respect to one another may be have a same magnitude or an approximately same magnitude. In some implementations, angles at which sensing element 310-1, sensing element 310-2, and sensing element 310-3 are oriented with respect to one another may be have different magnitudes.

In some implementations, example arrangement 420 may allow magnetic sensor 215 to identify a selected speed signal based on multiple speed signals determined by magnetic sensor 215. For example, magnetic sensor 215 may determine a first speed signal based on a difference between a strength of an in-plane component of the magnetic field sensed by sensing element 310-1 and a strength of an in-plane component of the magnetic field sensed by sensing element 310-2. Here, magnetic sensor 215 may determine a second speed signal based on a difference between the strength of the component of the magnetic field sensed by sensing element 310-2 and a strength of a component of the magnetic field sensed by sensing element 310-3. Similarly, magnetic sensor 215 may determine a third speed signal based on a difference between the strength of the component of the magnetic field sensed by sensing element 310-1 and the strength of the component of the magnetic field sensed by sensing element 310-3.

In this example, during rotation of tooth wheel 205, magnetic sensor 215 may select a particular speed signal, of the multiple speed signals, on which to base an output to be transmitted to ECU 220. For example, magnetic sensor 215 may select a strongest speed signal of the multiple speed signals (e.g., a speed signal with a greatest amplitude), a speed signal with an amplitude that satisfies a threshold, or the like, and may transmit, to ECU 220, an output corresponding to the selected speed signal.

In a manner similar to that described above, example arrangement 420 may allow magnetic sensor 215 to determine the multiple speed signals independent of a twist angle at which magnetic sensor 215 is mounted. Moreover, example arrangement 420 may improve performance and/or reliability of magnetic sensor 215 since magnetic sensor 215 may select a speed signal of the multiple speed signals (i.e., magnetic sensor 215 may not need to rely on a single speed signal for providing an output to ECU 220). Similarly, example arrangement 420 provides redundancy in the event of a failure and/or an error of a sensing element 310 of magnetic sensor 215 (i.e., magnetic sensor 215 can determine a speed signal, regardless of the twist angle, even when a single sensing element 310 fails). Additionally, example arrangement 420 allows magnetic sensor 215 to achieve true power on (TPO) capability (e.g., magnetic sensor 215 may provide information associated with an output state immediately upon powering-on).

FIG. 4C is a diagram of a third example arrangement 430 of sensing elements 310 included in magnetic sensor 215. As shown, magnetic sensor 215 may include sensing element 310-1, sensing element 310-2, sensing element 310-3, a fourth sensing element 310 (e.g., sensing element 310-1.2), a fifth sensing element 310 (e.g., sensing element 310-2.3), and a sixth sensing element 310 (e.g., sensing element 310-1.3). As shown in FIG. 4C, sensing element 310-1, sensing element 310-2, and sensing element 310-3 may be arranged in a manner similar to that described above with regard to example arrangement 420.

As further shown, sensing element 310-1.2 may be positioned approximately between sensing element 310-1 and sensing element 310-2, sensing element 310-2.3 may be positioned approximately between sensing element 310-2 and sensing element 310-3, and sensing element 310-1.3 may be positioned approximately between sensing element 310-1 and sensing element 310-3. As further shown, sensing element 310-1.2, sensing element 310-2.3, and sensing element 310-1.3 may be arranged at angles (e.g., 120°) with respect to one another. As such, respective axes of sensitivity of sensing element 310-1.2, sensing element 310-2.3, and sensing element 310-1.3 may be angled with respect to one another (e.g., each axis of sensitivity may be at a 120° angle with respect to the other axes of sensitivity). In some implementations, angles at which sensing element 310-1.2, sensing element 310-2.3, and sensing element 310-1.3 are oriented with respect to one another may have a same magnitude or an approximately same magnitude. In some implementations, angles at which sensing element 310-1.2, sensing element 310-2.3, and sensing element 310-1.3 are oriented with respect to one another may have different magnitudes.

In some implementations, example arrangement 430 may allow magnetic sensor 215 to determine a speed signal, independent of the twist angle at which magnetic sensor 215 is mounted, based on multiple speed signals determined by magnetic sensor 215, as described above with regard to example arrangement 420.

Additionally, or alternatively, example arrangement 430 may allow magnetic sensor 215 to determine a direction of rotation of tooth wheel 205. For example, magnetic sensor 215 may select a speed signal on which an output is to be based, as described above. Here, assume that magnetic sensor 215 selects a speed signal determined based on magnetic field strengths sensed by sensing element 310-1 and sensing element 310-2. In this example, magnetic sensor 215 may identify sensing element 310-1.2 as corresponding to the selected speed signal (e.g., since sensing element 310-1.2 is positioned approximately between sensing element 310-1 and sensing element 310-2). Magnetic sensor 215 may determine a magnetic field strength sensed by sensing element 310-1.2, and may perform differential direction detection in order to determine a direction of rotation of tooth wheel 205. Magnetic sensor 215 may then provide, to ECU 220, an output indicating the direction of rotation (e.g., an output that allows ECU 220 to identify the direction of rotation).

In a manner similar to that described above, example arrangement 430 may allow magnetic sensor 215 to determine the multiple speed signals independent of a twist angle at which magnetic sensor 215 is mounted. Additionally, example arrangement 430 may allow magnetic sensor 215 to determine a direction of rotation of tooth wheel 205 independent of a twist angle at which magnetic sensor 215 is mounted.

Moreover, example arrangement 430 may improve performance and/or reliability and/or improve redundancy of magnetic sensor 215, in a manner similar to that described above with regard to example arrangement 420. Example arrangement 430 may also provide redundancy for differential detection (e.g., since magnetic sensor 215 is capable of determining the direction of rotation even when one of sensing element 310-1.2, sensing element 310-2.3, or sensing element 310-1.3 fails and/or experiences an error). In some implementations, programming of magnetic sensor 215 may be needed in order to allow the magnetic sensor 215 to identify the direction of rotation (e.g., information associated with a mounting position may be stored by magnetic sensor 215 after mounting in order to identify a forward and backward direction of rotation).

The number and arrangement of sensing elements 310 shown in FIGS. 4A-4C are provided as examples. In practice, magnetic sensor 215 may include additional sensing elements 310, fewer sensing elements 310, different sensing elements 310, or differently arranged sensing elements 310 than those shown in FIGS. 4A-4C. Additionally, or alternatively, a set of sensing elements 310 (e.g., one or more sensing elements 310) of magnetic sensor 215 may perform one or more functions described as being performed by another set of sensing elements 310 of magnetic sensor 215.

Implementations described herein may relate to a differential magnetic sensor capable of TIM. In some implementations, the TIM-capable differential sensor may include two or more sensing elements capable of sensing an in-plane component of the magnetic field, and may be capable of determining a speed signal, based on the in-plane component of the magnetic field, independent of a twist angle at which the TIM-capable sensor is mounted (i.e., any angle from 0° to 360°, inclusive).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor, comprising:
    a first sensing element, a second sensing element, and a third sensing element;
        the first sensing element being capable of sensing a first component of a magnetic field,
            the first component of the magnetic field being non-parallel to an axis formed by an intersection of a first plane and a second plane,
                the first plane being a plane in which a tooth wheel rotates, and
                the second plane including a first surface of the first sensing element and a second surface of the second sensing element, and
            the first component of the magnetic field being on the second plane;
        the second sensing element being capable of sensing a second component of the magnetic field,
            the second component of the magnetic field being on the second plane; and
        the third sensing element being capable of sensing a third component of the magnetic field,
            the third component of the magnetic field being on the second plane;
    where the magnetic sensor is to:
        determine a plurality of speed signals based on the first component of the magnetic field, the second component of the magnetic field, and the third component of the magnetic field; and
        output at least one of the plurality of speed signals.

2. The magnetic sensor of claim 1, where an angle formed by the first component of the magnetic field and the axis is in a range between zero and approximately ninety degrees.

3. The magnetic sensor of claim 1, where the first component of the magnetic field is parallel to or aligned with the second component of the magnetic field.

4. The magnetic sensor of claim 1,
where the third component of the magnetic field is non-parallel to the axis formed by the intersection of the first plane and the second plane.

5. The magnetic sensor of claim 1, where an arrangement of the first sensing element, the second sensing element, and the third sensing element permit the magnetic sensor to determine a direction of a rotation of the tooth wheel.

6. The magnetic sensor of claim 1, further comprising:
a fourth sensing element capable of sensing a fourth component of the magnetic field,
the fourth component of the magnetic field being non-parallel to the axis formedby the intersection of the first plane and the second plane,
the fourth component of the magnetic field being on the second plane, and
the first sensing element, the second sensing element, the third sensing element, and the fourth sensing element being arranged to permit the magnetic sensor to determine multiple speed signals, associated with a rotation of the tooth wheel, and a direction of the rotation of the tooth wheel.

7. The magnetic sensor of claim 1, where the first sensing element and the second sensing element are magnetoresistive sensing elements.

8. A magnetic circuit, comprising:
a magnetic sensor to:
sense a first component of a magnetic field that is angled with respect to an axis formed by an intersection of a first plane and a second plane,
the first plane being a plane in which a tooth wheel rotates,
the second plane corresponding to a surface of the magnetic sensor, and
the first component of the magnetic field lying on the second plane;
sense a second component of the magnetic field,
the second component of the magnetic field lying on the second plane;
sense a third component of the magnetic field,
the third component of the magnetic field lying on the second plane;
determine a plurality of speed signals, associated with a rotation of the tooth wheel, based on the first component of the magnetic field, the second component of the magnetic field, and the third component of the magnetic field; and
provide an output based on at least one of the plurality of speed signals.

9. The magnetic circuit of claim 8, where the second component of the magnetic field is angled with respect to the axis formed by the intersection of the first plane and the second plane.

10. The magnetic circuit of claim 8, where the first component of the magnetic field is parallel to or aligned with the second component of the magnetic field.

11. The magnetic circuit of claim 8, where the a third component of the magnetic field is angled with respect to the axis formed by the intersection of the first plane and the second plane.

12. The magnetic circuit of claim 8,
where the magnetic sensor, when determining the plurality of speed signals, is to:
determine a first speed signal based on the first component of the magnetic field and the second component of the magnetic field;
determine a second speed signal based on the first component of the magnetic field and the third component of the magnetic field;
determine a third speed signal based on the second component of the magnetic field and the third component of the magnetic field; and
where the magnetic sensor is further to:
select the first speed signal, the second speed signal, or the third speed signal as a selected speed signal for output.

13. The magnetic circuit of claim 8, where the magnetic sensor is further to:
sense a fourth component of the magnetic field that is angled with respect to the axis formed by the intersection of the first plane and the second plane,
the fourth component of the magnetic field lying on the second plane; and
where the magnetic sensor is further to:
determine a direction of rotation of the tooth wheel based on the fourth component of the magnetic field; and
provide another output indicating the direction of rotation of the tooth wheel.

14. The magnetic circuit of claim 8, where the magnetic sensor is further to:
determine a direction of rotation of the tooth wheel based on the third component of the magnetic field; and
provide another output indicating the direction of rotation of the tooth wheel.

15. The magnetic circuit of claim 8, where the magnetic sensor is a magnetoresistive sensor.

16. A differential sensor comprising:
a first magnetoresistive (MR) sensing element, a second MR sensing element, and a third MR sensing element,
the first MR sensing element being capable of sensing a first component of a magnetic field that is at a non-zero angle with respect to an axis formed by an intersection of a first plane and a second plane,
the first plane being a plane in which a tooth wheel rotates,
the second plane corresponding to a surface including the first MR sensing element, the second MR sensing element, and the third MR sensing element, and
the first component of the magnetic field being on the second plane;
the second MR sensing element being capable of sensing a second component of the magnetic field,
the second component of the magnetic field being on the second plane;and
the third MR sensing element being capable of sensing a third component of the magnetic field,
the third component of the magnetic field being on the second plane;
where the differential sensor is to:
determine a plurality of speed signals based on the first component of the magnetic field, the second component of the magnetic field, and the third component of the magnetic field; and
output at least one of the plurality of speed signals.

17. The differential sensor of claim 16, where the first component of the magnetic field is angled with respect to the second component of the magnetic field.

18. The differential sensor of claim 16, where the first component of the magnetic field is parallel to or aligned with the second component of the magnetic field.

19. The differential sensor of claim 16, where the third component of the magnetic field is at a non-zero angle with respect to the axis formed by the intersection of the first plane and the second plane.

20. The magnetic sensor of claim 1, where a first axis of sensitivity of the first sensing element, a second axis of sensitivity of the second sensing element, and a third axis of sensitivity of the third sensing element are angled with respect to each other.

* * * * *